Oct. 18, 1949.  G. P. SUTTON ET AL  2,485,515
PRESSURE PICKUP
Filed Oct. 3, 1947  2 Sheets-Sheet 1
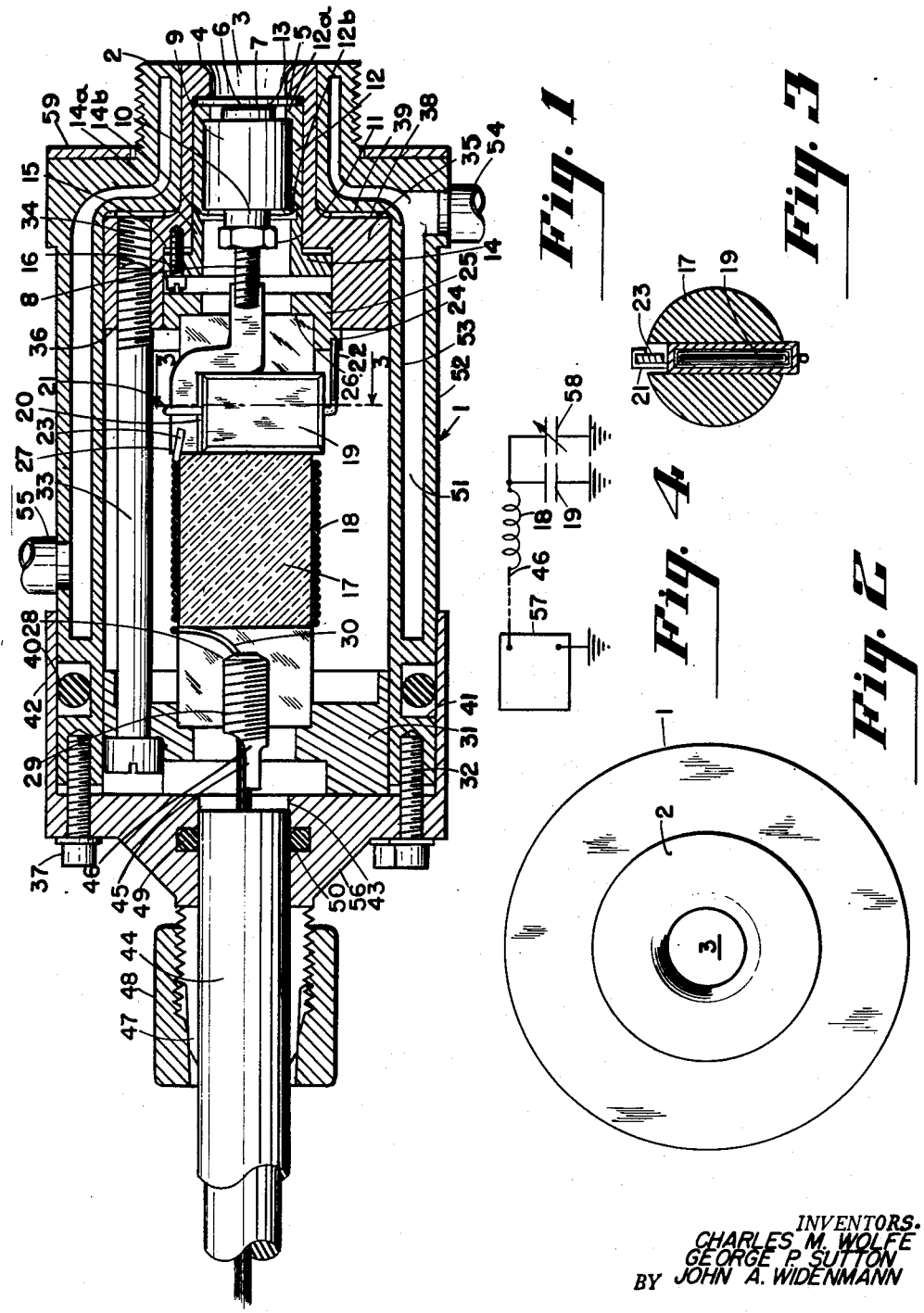
INVENTORS.
CHARLES M. WOLFE
GEORGE P. SUTTON
BY JOHN A. WIDENMANN
Christie and Angus
ATTORNEYS Oct. 18, 1949.   G. P. SUTTON ET AL   2,485,515
PRESSURE PICKUP Filed Oct. 3, 1947   2 Sheets-Sheet 2

INVENTORS.
CHARLES M. WOLFE
GEORGE P. SUTTON
BY JOHN A. WIDENMANN

Christie and Angus
ATTORNEYS

Patented Oct. 18, 1949

2,485,515

UNITED STATES PATENT OFFICE 2,485,515

PRESSURE PICKUP

George P. Sutton, Los Angeles, Charles M. Wolfe, Covina, and John A. Widenmann, South Pasadena, Calif., assignors to Aerojet Engineering Corporation, Azusa, Calif., a corporation of Delaware Application October 3, 1947, Serial No. 777,822

9 Claims. (Cl. 323—76)

This invention relates to electrical pickup devices and particularly to such pickups of the variable capacity type; and has for its principal object to provide such a pickup adapted to respond to a wide range of frequencies and to withstand severe vibrations and shocks in usage.

There are many instances making desirable the use of an extremely sensitive pickup device adapted to respond to vibrations over a wide range of intensities and frequencies under adverse conditions of measurement. A typical example of this is in making pressure measurements on jet propulsion devices including aero-resonators and the like. It is desirable to measure and record the changes in pressure in the explosion and combustion chambers of such devices. These pressures occur over a wide range of intensity and at high frequencies, and furthermore, the equipment itself is undergoing severe shock and vibration during tests. Accordingly it is required that a pickup device for picking up the pressure changes must not only be responsive to the variations of pressure intensity and frequency, but must also be able to withstand the very severe vibration due to the operation of the equipment. Furthermore, there is often much heat developed, which in itself requires that the pickup device must be able to withstand the severe heat and must not have its response characteristics substantially altered by the change in temperature.

In accordance with our invention, we provide a pickup especially adapted to perform the foregoing purposes. We carry out our invention by the provision of a unique construction and arrangement of a condenser element of the pickup in relation with a vibratory diaphragm adapted to receive the pressure changes from the chamber whose pressure is to be measured.

A feature of our invention is the construction and provision of a coil and condenser arrangement for controlling the transmission characteristic of the line which is connected with the pickup. This coil and condenser arrangement is secured behind the condenser pickup elements, so as to maintain their relative positions, substantially free from damage or alteration due to shocks, vibration or temperature changes.

Another feature is the provision of a casing or housing forming an assembly means and chamber for the pickup and its associated coil and condenser arrangement. A related feature is the provision of means whereby a coaxial cable or the like is led into the chamber to make connection with the coil and condenser and pickup elements.

A subordinate and desirable feature is the provision of a fluid cooling jacket built into the casing to minimize high temperatures from the chamber being measured.

A related feature in a preferred embodiment is the provision of cooling means for cooling the diaphragm and forward end of the pickup.

The foregoing and other features of our invention will be better understood from the following detailed description and the accompanying drawing of which:

Fig. 1 is a longitudinal view in cross-section taken at line 1—1 of Fig. 2; showing an embodiment of our invention;

Fig. 2 is an end view looking into the chamber end of the pickup;

Fig. 3 is a view in cross-section taken at line 3—3 of Fig. 1, showing a detail of the construction;

Fig. 4 is a schematic electrical circuit diagram showing the electrical circuit of the pickup of Fig. 1;

Figure 5:
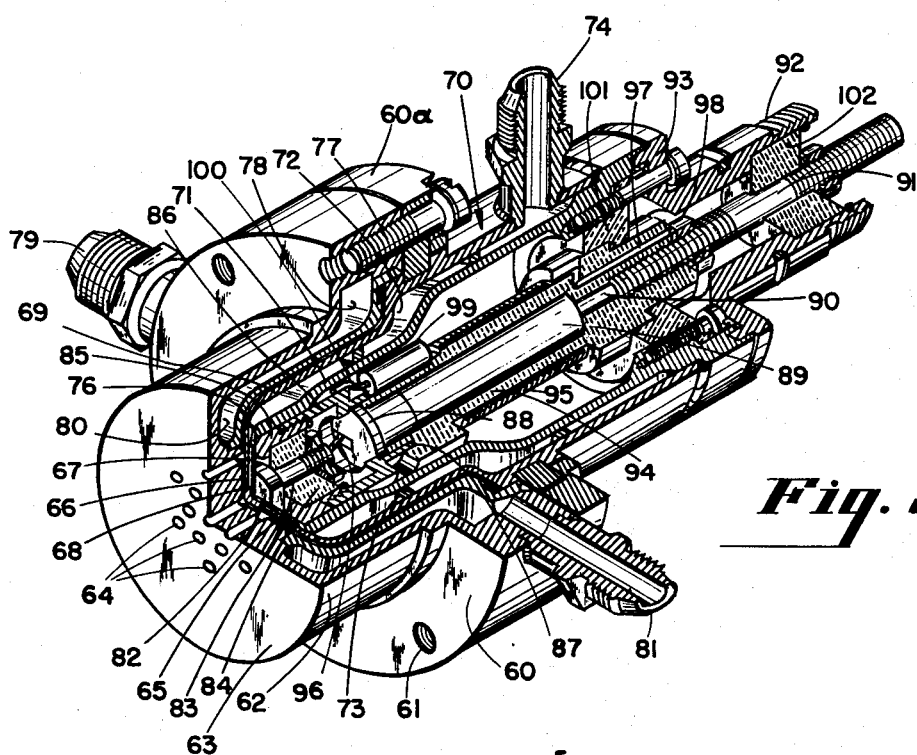
Fig. 5 is an isometric view partially broken away in section, showing a modified form of a pickup device according to our invention, the section being taken at line 5—5 of Fig. 6.

Referring to the embodiment of Figs. 1 to 3, the pickup comprises a housing 1 narrowed and threaded at its forward end 2 for attachment through the wall of the chamber or device whose pressure is to be measured; for example, the combustion chamber of a jet propulsion motor or aero-resonator. This forward end is provided with a forward opening 3 for communication with the chamber, and there is inserted at this forward end a liner 4, which may be of a suitable metal, preferably one which does not have a very great coefficient of temperature expansion, for example, Invar. The liner 4 is provided near its forward end with a shoulder 5 against which there is placed the periphery of a suitable diaphragm 6 constituting one of the capacity plates of the pickup.

The fixed plate of the condenser pickup is in the form of a button 7 provided with a stem 8 protruding backward from the diaphragm. The stem 8 of the button is threaded through cooperating threads of an insulating cylinder 9, so that the head of the button 7 is screwed up tight against the end of the insulating cylinder, which may for example be a suitable insulator such as Isolantite, or some other porcelain or the like. In back of the cylinder 9 is placed a washer 10, and a nut 11 is tightened down against the washer. This button and insulating assembly is held within a shell 12 which is preferably a suitable metal having a low temperature coefficient of expansion, such as Invar.

The shell is provided with end flanges 12a and 12b to retain the cylinder 9 firmly in position. The forward end of this shell 12 is placed against the diaphragm 6 to hold its periphery firmly between the flange 12b and the shoulder 5, so that the diaphragm cannot move but is free to vibrate back of the opening 3, and thereby to produce corresponding changes of capacity between members 6 and 7 by change of the clearance space 13 between these condenser elements, in a well known manner. The pickup plate assembly is held together by a flanged collar 14 having a cylindrical portion 14a provided with a shoulder 14b, which bears against a corresponding shoulder of shell 12; the flange being fastened to a shoulder 15 of the member 4 by suitable screws 16.

There is located behind the pickup plates within the forward neck of the housing, a coil and condenser arrangement electrically connected to the pickup plates. This comprises a cylindrical rod 17 of Isolantite or other suitable insulating material, on which is wound an inductance coil 18, and on which is supported a condenser 19. The inductance coil is wound around the periphery of the rod; and the condenser is supported within a slot 20, formed through the rod. The condenser may conveniently be of a rectangular prism shape as shown, in which case the slot may have parallel opposite pairs of sides so that the condenser will fit snugly within it.

The condenser is provided with terminal leads 21 and 22 which are rigid and strong enough to support the condenser, and these leads are soldered to respective terminal connections in a manner to support and electrically connect the condenser in circuit. Lead 21 is attached to and soldered to a connecting strip 23. This may conveniently be a flat metallic strip formed in the shape shown, so that one end thereof may be fitted into a slot in the end of member 8 from the condenser button, and a portion of the connector coming from the slot is embedded in the material of the rod 17. Lead 21 is fastened to connector 23 and the connection is preferably soldered or otherwise secured. The other condenser terminal 22 is soldered at 24 to a suitable ring, for example a ring 25 of brass or the like having a shoulder 26 to support the end of the rod 17, as shown.

One end of the coil 18 is attached to the connector strip 23, for example by soldering at 27; and the other end of the coil is carried down to protrude into the base of bore 28 coaxially located at the rear end of rod 17. A terminal stud 29 is threaded into the bore, and appropriate solder or the like preferably placed in the base of the bore prior to threading so that the material can be heated up to melt the solder and make a connection between the end member 30 of the coil and the connector 29.

The coil and condenser assembly is held in place between the forward retainer ring 25 and a rear retainer ring 31, the rear ring having a shoulder 32 somewhat similar to the shoulder 26 of the forward ring, so that the rear end of the rod will rest against the shoulder. Suitable bolts 33 passing through the rear ring 31 and threaded into suitable threaded holes 34 in an enlarged shoulder 35 of member 4, serve to tighten up the assembly and to hold the shoulder of forward ring 25 against the rear end 36 of member 35, thereby maintaining the coil and condenser assembly in firm coaxial relation with the forward pickup assembly.

The entire assembly of the pickup and the condenser and coil is maintained securely in place within the housing by the rear head 56 which is fastened by screws 37 into the rear end of the housing to tighten down the head against the rear end 31 and maintain the assembly secure against a suitable washer 38 fitted between the forward end of flange 35 and a similar shoulder 39 in back of the neck of the housing.

Means is provided for maintaining the interior of the housing moisture-proof and watertight. This watertightness is maintained at the forward end by the fact that the diaphragm 6 is securely maintained against the flange 4 and the fact that the washer 38 for example of soft lead, maintains the watertightness there. The rear portion of the assembly is maintained watertight by means of a resilient O-ring 40 fitted into a recess 41 at the rear exterior of the housing; and an elongated cylindrical flange 42 extends forward from the head 36 to envelope the O-ring and form the seal.

Means is provided for connecting the pickup with a coaxial cable which is desirable or sometimes even necessary to transmit the desired frequency range. This connecting means comprises a passageway 43 located coaxially through the rear head 56 and into which there is inserted the end of the connecting cable 44. The end of the cable 44 is cut away sufficient to expose a length of its central conductor 45 so that it will extend to the connecting end 46 of the connecting member 29, and a soldered connection may be made there. There extends from the rear end of the head 56 a cylindrical extension 47 through which the cable extends, the exterior of member 47 being threaded and tapered to receive a locking nut 48 which may be screwed up to tighten down member 47 against the exterior of the cable. To guard against leakage of water and moisture the head 56 is provided with a recess 49 into which there is inserted a resilient O-ring 50 which provides the seal.

Where the pickup is to be used in connection with motors and devices operating at high temperatures, it may often be desirable to provide cooling means, such as those illustrated in the structure, this taking the form of the cooling jacket 51 provided around the exterior of the housing between the outer wall 52 and the inner wall 53. The inlet and outlet conduits 54 and 55 are provided leading into the jacket, through which the cooling fluid may be circuited in a well known manner.

In operation, the threads 2 will be threaded into the opening in the wall of the chamber whose pressure is to be measured, preferably with some sort of a washer 59 to prevent leakage. The changes in pressure within the chamber will be manifested by corresponding vibration of the diaphragm 6 which will change the capacity between members 6 and 7. Since the diaphragm 6 is grounded and member 7 is ungrounded, this change of capacity will occur across the condenser 19. There are connected in series with the parallel-arranged condenser 19 and pickup plates, the coil 18 which leads to the ungrounded central conductor 46 of the cable, the outside conductor of which is grounded. The electrical circuit is shown schematically in Fig. 4 wherein the variable capacity 58 represents the capacity of the pickup between the plates 6 and 7, capacity 19 represents the capacity of condenser 19 and inductance 18 represents the inductance coil 18, lead 46 connects to the cable 44 in Fig. 1, and the box 57 represents the electrical equipment to which the pickup may be connected. The electrical equipment 57 responsive to capacity changes of the pickup is no part of the present invention and may take any desired form suitable for the purpose. It may for example, be a frequency modulator oscillating equipment whose frequency is dependent on the change of capacity 58.

The values of coil 18 and condenser 19 are preferably so selected with reference to the characteristic impedance of the cable and its length, that changes of the pickup capacity 58 will be fully manifested at the electronic equipment 57; and moreover it will tend to minimize the effect of changes of the impedance of the cable due to vibration.

The electrical values are not especially critical, but the following are submitted as a set of values which have been found suitable in practice.

Diameter of diaphragm 6 _____ inch__ 5/8
Diameter of button 7 _____ do____ 5/16
Spacing between diaphragm 6 and button 7 _____ inch__ .003
Coil 18 _____ microhenries__ 19
Condenser 19 _____ micromicrofarads__ 50
Characteristic impedance of cable__ohms__ 72

Figure 6:
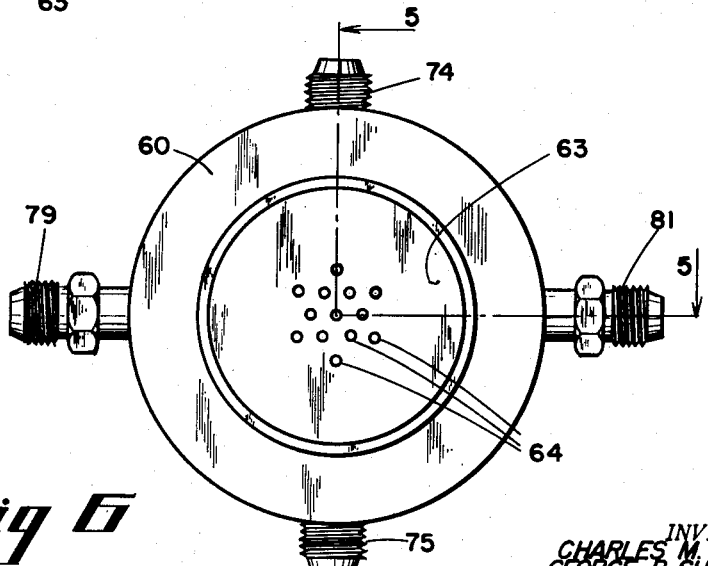
Fig. 6 shows an end view of the device of Fig. 5.

Figs. 5 and 6 shows a modification of the pickup device according to our invention, which is provided with a pickup shield and with a cooling arrangement for the pickup and the diaphragm. In this construction, the pickup is adapted to be connected with the chamber whose pressure is to be measured by a supporting flange 60 provided with holes 61 through which bolts can pass to bolt the flange to a corresponding boss around an opening in the chamber. The flange has formed integral with it a forwardly protruding cylindrical portion 62 covered at its front end by a diaphragm guard in the general form of a heavy disc 63, having through it a number of holes 64 through which the pressure from the chamber being measured is communicated to the area in front of the diaphragm. The diaphragm 65 in this construction is divided into a thin front wall 66 and a thin rear wall 67, leaving between these diaphragm walls a narrow space 68.

The front diaphragm wall is fastened, for example, by welding, to the outer wall 69 of a body member 70 which is the main support for the pickup. This body member is generally cylindrical in shape, tapering to different diameters as shown; and it is arranged for water cooling. The wall 69 is the outer wall for the fluid cooling chamber, the inner wall of which is its wall 71.

The space 72 between the walls 69 and 71 is the space through which the cooling fluid flows; and to cause the cooling fluid to move in a spiral path, there is provided a spiral vane 73 running spirally within the cooling jacket and leading forwardly. Two conduits 74 and 75 are connected at opposite sides of the body portion 70 and communicate with opposite ends of the cooling jacket.

The rear diaphragm wall 67 is fastened, preferably by welding, to the forward end of the inner wall 71 of the cooling jacket, and is also fastened to the forward diaphragm wall 66; but spaces 76 are provided which lead from the forward end of fluid space 72 into the narrow space 68 within the diaphragm. By this arrangement, fluid entering inlet conduit 74 flows spirally around the jacket 72, through the diaphragm and out the outlet conduit 75.

The flange 60 is fastened to a flange 60a of the body member by bolt 77 so as to maintain a rigid construction. The flange 60 has formed within it a space 78 in communication with a conduit 79, and this space 78 runs forwardly within the cylindrical member 63 and bends toward the center at position 80 within the protective member 63. The space or jacket 78 extends around the cylindrical member 63 and at the side thereof opposite conduit 79 there is provided another conduit 81. By this arrangement water or other cooling fluid can be admitted into one of conduits 79 or 81, circulated through the jacket space 78, and taken out of the other of the conduits.

With the exception of the difference of construction due to the cooling arrangement just described, the pickup of Fig. 5 contains equipment analogous to the similar electrical equipment in Fig. 1. Thus, there is provided back of the diaphragm an electrical member or button 82, constituting the other plate of the variable condenser, the first plate of which is formed by the rear wall 67 of the diaphragm. The button 82 is connected to a bolt portion 83 extending through its supporting insulator 84 which is held within a cylindrical metallic support 85, which in turn is threaded to a metallic supporting member 86 held within the forward end of the housing member 70.

The support 86 has a sleeve 87 supporting the flange 88 at the forward end of a metallic sleeve 89, the rear end of which has a pin 90 maintained in contact with the threaded end of a stud 91 which protrudes rearwardly from the unit. The bolt 83, and the members 89, 90 and 91 are located coaxially within the unit and they form at the rear the central conductor of a coaxial line, the outer conductor of which is the threaded fitting 92 having a flange 93 which is bolted to the body member at the rear.

For the purpose of insulating this central conductor there is provided a solid insulating member 94 which may be of Isolantite or the like around which is wound inductance coil 95. The forward end of the inductance coil is connected to lead 96 from the bolt 83, and the rear end of the coil is brought down through space 97 and attached to the conducting bushing 98, threaded to the central conductor 91. The lead 96, in addition to connecting with the forward end of coil 95, also connects with one end of condenser 99, the opposite end of which is connected by lead 100 to the body portion to ground it.

Insulator 94 is supported within an outer insulating ring 101 to support insulator 94 at its rear end. The rear end of stud 91 is supported by an insulating member 102 spacing it concentrically within member 92.

It will be recognized that the electrical system in Fig. 5 is like that in Fig. 1.

The pickup devices according to our invention are particularly adapted for handling the wide range of pressure intensities and frequencies such as are encountered in combustion chambers of jet motors and the like. Furthermore, they are well suited to avoid undesirable changes in its pickup response due to changes in temperature and the like. The presence of the coil and condenser serve to reduce the effect of any errors which otherwise might be introduced by the vibration of the coaxial cable. Moreover the rigid and axial construction of the coil-condenser arrangement behind the pickup but in the housing avoid the effects and danger of breakage and misalignments from the vibration and shock.

A further advantage of the construction is that it enables different weight diaphragms 6 and different size buttons 7 to be substituted as may be desired, to adapt the pickup to particular conditions of pressure and frequency.

We claim:

1. A pressure responsive device comprising a housing, a vibratory diaphragm responsive to changes of pressure mounted in an opening from said housing, said diaphragm comprising two spaced vibratory walls, each integral with the housing and providing space therebetween for fluid flow, and means for sending a flow of cooling fluid into and out of the space, a condenser surface within the housing in spaced relation to said diaphragm and providing capacity between the surface and the diaphragm dependent on the pressure on the diaphragm, a coil form placed within the housing in coaxial relationship in back of the condenser surface, a coil wound on the form and connected with the condenser surface, a condenser secured to the form and having one of its terminals attached to the terminal of the coil which is connected with the condenser surface, and having its other terminal connected to the casing to which the diaphragm is connected, and means for permitting the entry of an electric transmission line into the rear of said housing to connect with the coil.

2. A pressure responsive device comprising a vibratory diaphragm responsive to changes in pressure, said diaphragm comprising two spaced walls providing space for fluid flow therebetween, with means for a cooling fluid flow into and out of the space, a button having a surface in spaced relation to said diaphragm and providing capacity between the surface and the diaphragm depending on the pressure on the diaphragm, said button having a stem portion extending rearwardly from the diaphragm and in coaxial relation with the diaphragm, said stem being imbedded in an insulating material, a cylindrical insulating form in coaxial relationship with the stem of the button and to the rear of the button, a coil on the form having one terminal connected with the stem, a condenser secured to the form and having one of its terminals connected to the terminal of the coil which is connected with the stem, and having its other terminal connected electrically to the diaphragm.

3. A device according to claim 2 in which the condenser is placed in a slot formed in the form.

4. A pressure responsive device comprising a housing, a vibratory diaphragm responsive to changes of pressure mounted in an opening of said housing, a guard wall acting as a shield forming the end of the housing and covering the front of the diaphragm, there being a plurality of holes through said guard wall leading into a space between the guard wall and the diaphragm to convey pressure to the diaphragm, the total cross-section area of said holes being substantially greater than the area of the space between the shield and the diaphragm, a button located within the housing and in spaced relation to the diaphraghm and providing capacity between the surface of the button and the diaphragm, depending upon the pressure on the diaphragm, said button having a stem protruding rearwardly into the housing, a cylindrical insulating form within the housing in coaxial relationship with the stem, a coil wound on the form, a rigid connector connecting one end of the coil with the stem and imbedded in the insulation of said form, a condenser also imbedded in the insulation of the form and having one terminal connected with said coil terminal and having its other terminal connected electrically to the diaphragm, and an opening at the rear of the housing through which a coaxial transmission line enters, the central conductor of the line being connected with the other terminal of the coil.

5. A device according to claim 4 in which there is a hollow ring at the forward end of the insulating form and another hollow ring at the rear end of the form, and means for securing the rings together to squeeze the form between them.

6. A device according to claim 4 in which the housing is provided with a rear closure head, and means for sealing the head to the housing, said sealing means comprising a seal between the outside of the coaxial cable and the housing.

7. A pressure responsive device comprising a housing, a vibratory diaphragm held at an opening of the housing, said diaphragm comprising two spaced vibratory walls, each integral with the housing and providing space therebetween for fluid flow, and means for sending a flow of cooling fluid into and out of the space, a condenser surface located in spaced relation to the diaphragm within the housing and having a stem protruding rearwardly into the housing, a coil and condenser located within the housing, the coil being connected in series with the stem and the condenser being connected electrically between the stem and the diaphragm said housing being provided with a jacket through which a cooling fluid is passed.

8. A pressure responsive device comprising a housing, a vibratory diaphragm responsive to changes of pressure mounted in an opening from said housing, a condenser surface within the housing in spaced relation to said diaphragm and providing capacity between the surface and the diaphragm dependent on the pressure on the diaphragm, a coil form placed within the housing in coaxial relationship in back of the condenser surface, a coil wound on the form and connected with the condenser surface, a condenser secured to the form and having one of its terminals attached to the terminal of the coil which is connected with the condenser surface, and having its other terminal connected to the casing to which the diaphragm is connected, and means for permitting the entry of an electric transmission line into the rear of said housing to connect with the coil, said diaphragm having a front wall and a rear wall with a space therebetween, and a cooling fluid jacket within the housing, and communicating channels between the jacket and the space for causing cooling fluid to flow through the space in the diaphragm.

9. Pressure-responsive device according to claim 8, in which the housing is provided with a second jacket around its cylindrical wall and means for causing cooling fluid to enter the jacket and to leave the jacket.

GEORGE P. SUTTON.
CHARLES M. WOLFE.
JOHN A. WIDENMANN.

REFERENCES CITED

The following references are of record in the file of this patent:

UNITED STATES PATENTS

| Number | Name | Date |
| --- | --- | --- |
| 2,113,376 | Janco | Apr. 5, 1938 |
| 2,178,471 | De Bruin | Oct. 31, 1939 |
| 2,250,471 | De Bruin | July 29, 1941 |
| 2,439,047 | Grinstead | Apr. 6, 1948 |